United States Patent [19]
Yasutake et al.

[11] Patent Number: 5,650,614
[45] Date of Patent: Jul. 22, 1997

[54] OPTICAL SCANNING SYSTEM UTILIZING AN ATOMIC FORCE MICROSCOPE AND AN OPTICAL MICROSCOPE

[75] Inventors: Masatoshi Yasutake, Chiba; Naohiko Fujino, Hyogo, both of Japan

[73] Assignee: Mitsubishi Electric Corporation, Hyogo, Japan

[21] Appl. No.: 564,747

[22] Filed: Nov. 29, 1995

[30] Foreign Application Priority Data

Nov. 29, 1994 [JP] Japan .................................. 6-295113

[51] Int. Cl.$^6$ .................................................. G01B 7/34
[52] U.S. Cl. ................................... 250/234; 250/306
[58] Field of Search ........................... 250/234, 201.3, 250/306, 307; 73/105

[56] References Cited

U.S. PATENT DOCUMENTS

| | | |
|---|---|---|
| 5,117,110 | 5/1992 | Yasutake et al. . |
| 5,177,559 | 1/1993 | Batchelder et al. . |
| 5,394,741 | 3/1995 | Kajimura et al. ............. 250/306 |
| 5,426,302 | 6/1995 | Marchman et al. ............. 250/306 |
| 5,496,999 | 3/1996 | Linker et al. ............. 250/306 |

FOREIGN PATENT DOCUMENTS

| | | |
|---|---|---|
| 527448 | 2/1993 | European Pat. Off. . |
| 633450 | 1/1995 | European Pat. Off. . |
| 8503353 | 8/1985 | WIPO . |

Primary Examiner—Edward P. Westin
Assistant Examiner—Kevin Pyo
Attorney, Agent, or Firm—Loeb & Loeb LLP

[57] ABSTRACT

A light-scattering optical system is incorporated in an AFM instrument for a large sample. The instrument is equipped with an optical microscope. Incident light is introduced into the optical microscope to provide a dark field. The incident angle to the surface of a sample is made variable. The incident light is introduced into the main enclosure of the AFM through two optical fibers. Light reflected from the surface of the sample is received by a detector split into two parts. The dark field microscope is automatically brought to focus in response to signals from the detector. The whole apparatus is enclosed in a sound-insulating dark box to enhance the S/N during detection of scattered light.

5 Claims, 8 Drawing Sheets

(xi, yj, zij)

(xi, zi)

L : HALF-VALUE WIDTH

OPTICAL SCANNING SYSTEM UTILIZING AN ATOMIC FORCE MICROSCOPE AND AN OPTICAL MICROSCOPE

BACKGROUND OF THE INVENTION

Generally, the present invention relates to a measuring instrument and, more particularly, to a scanning probe microscope with aligning function, the scanning probe microscope acting to detect the position of a certain foreign substance, crystal defect, or the like on a sample and to measure the shape at a subnanometer resolution.

Foreign matter-inspecting apparatuses using optical methods are available as instruments for inspecting foreign matter on a sample (generally, a wafer). Examples include WIS9000 manufactured by ESTEK Corporation and Surfscan 6200 manufactured by Tencor Corporation. Any of these instruments produces output signals indicating the size of the foreign matter and the position, or coordinates.

The prior art method of analyzing the shape of a foreign substance and making an elemental analysis of it is implemented by an apparatus which receives coordinates from the aforementioned foreign matter-inspecting apparatus, analyzes the shape of the foreign substance, and makes an elemental analysis of it with a scanning electron microscope (SEM) or the like. Examples of this apparatus include SAI9600 manufactured by Seiko Electronic Industries Corporation. Linkage of coordinates between the foreign matter-inspecting apparatus and the SEM is described in Patent Laid-Open No. 174644/1994.

Furthermore, an atomic force microscope or microscopy (AFM) has been proposed as an instrument capable of observing a sample at an atomic resolution. This AFM is disclosed, for example, in Patent Laid-Open No. 130202/1987. A method of aligning the probe of an AFM with the optical axis of an optical microscope is described in Patent Laid-Open No. 40356/1991. With this method, the distance ($x_1$) between the probe and the optical axis of the optical microscope can be easily calculated. The AFM is equipped with a cantilever having a sharp protruding portion (probe) at its free end. When the probe is brought closer to the sample, the free end of the cantilever is displaced by the interaction (atomic force) exerted between the atoms at the front end of the probe and the atoms on the surface of the sample. The probe is scanned along the surface of the sample while measuring the displacement of the free end electrically or optically. In this way, three-dimensional information about the sample is obtained. For example, if the probe is scanned while controlling the distance between the probe and the sample in such a way that the displacement of the free end of the cantilever is kept constant, then the front end of the probe moves along the topography of the sample surface. Consequently, a three-dimensional image representing the surface topography of the sample can be obtained from the information about the position of the front end of the probe.

When a foreign substance is observed with an SEM, if the diameter of the foreign substance is less than 0.1 μm, or if the height of the foreign substance is as low as several nanometers, then it is difficult to detect the foreign substance with the SEM. Especially, an element of the same species, e.g., a silicon foreign substance on a silicon wafer, is very difficult to observe with the SEM. Furthermore, it is difficult for the SEM to discern whether the foreign matter on the wafer is convex or concave. Where the coordinates are linked to the foreign matter-inspecting apparatus, the aligning accuracy is normally on the order of ±100 μm. The possibility that a foreign substance of the order of 0.1 μm is detected in a short time is very low.

On the other hand, the AFM makes a mechanical scan and so the scanning velocity is low. Furthermore, the maximum field of view is as narrow as 100 μm. Therefore, the possibility that a foreign substance of the order of 0.1 μm is detected is low, in the same way as in SEM. Since the problems described above occur, it is an object of the invention to solve these problems.

SUMMARY OF THE INVENTION

In order to solve the foregoing problems, the present invention uses an AFM capable of measuring three-dimensional shape at a high resolution as a shape-observing apparatus instead of an SEM.

FIG. 1 is a view illustrating the function of the present invention. The apparatus has a light-scattering optical system which is composed of a laser light source 15 acting as an incident light source, an optical microscope 7, and a high-sensitivity image detector 8. A sample 1 is placed on a stage 4. The distance $x_1$ between the optical axis $a_x$ of the optical microscope 7 and the front end $a_2$ of the cantilever 3 of an AFM instrument 2 is known. After observing foreign substance 0 with the optical microscope 7, it is made to move the distance $x_1$. Thus, it is easy to measure the shape of the foreign substance 0 with the AFM instrument 2. The AFM instrument is of the lever scanning type, i.e., the cantilever 3 scans the sample surface.

Light directed to the sample 1 from the light source 15 is scattered by the foreign substance 0. An image of the scattered light is detected by the optical microscope 7 and the high-sensitivity image detector 8. This scattered light image-generating portion is brought just under the optical axis $a_1$ by moving the stage 4. Then, the stage 4 is again caused to move the distance $x_1$. The foreign substance 0 is brought just under the cantilever 3. Then, the AFM instrument 2 measures the shape.

DETAILED DESCRIPTION OF THE INVENTION

Figure 1:
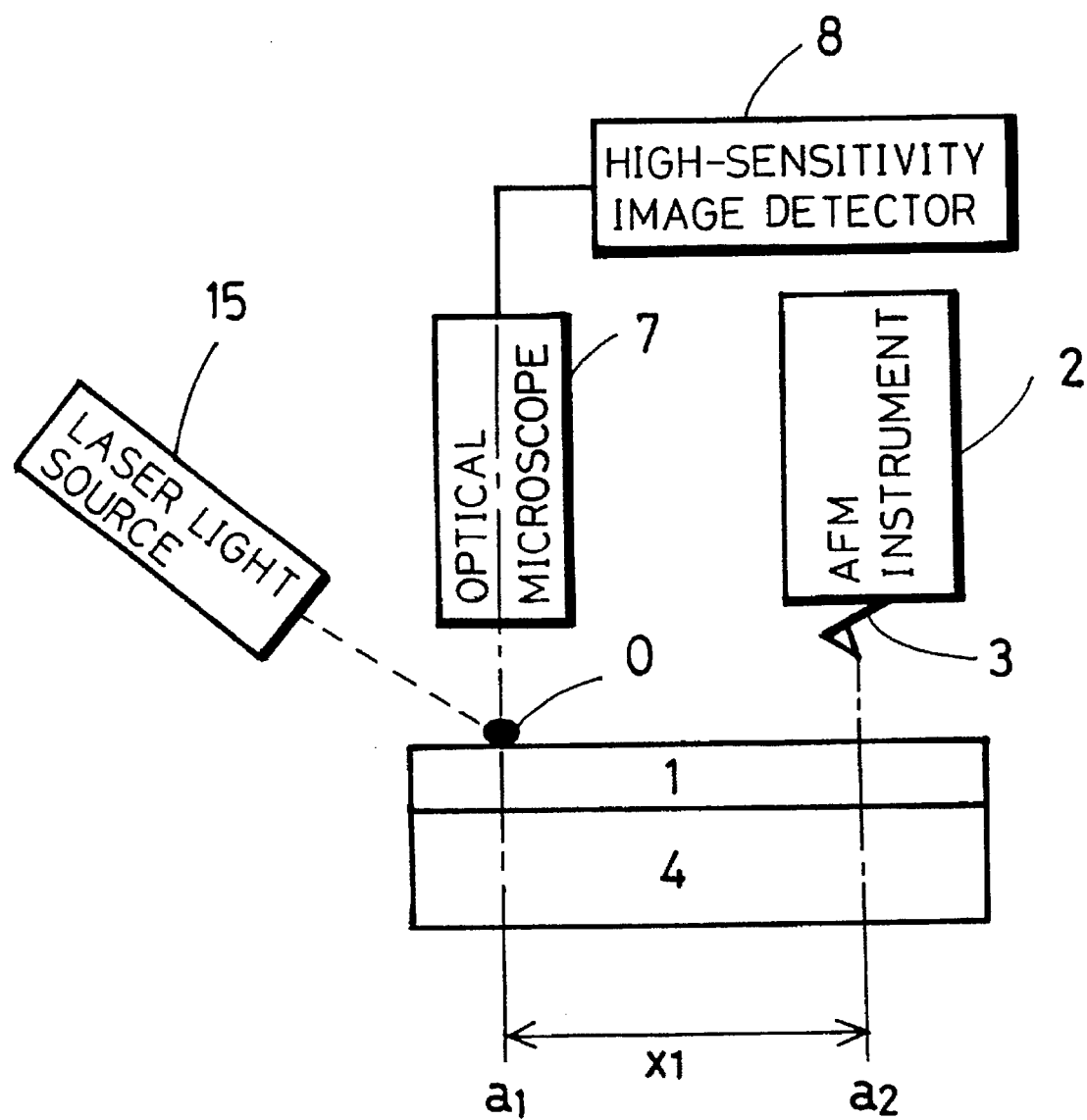
FIG. 1 is a view showing functions.
Figure 2:
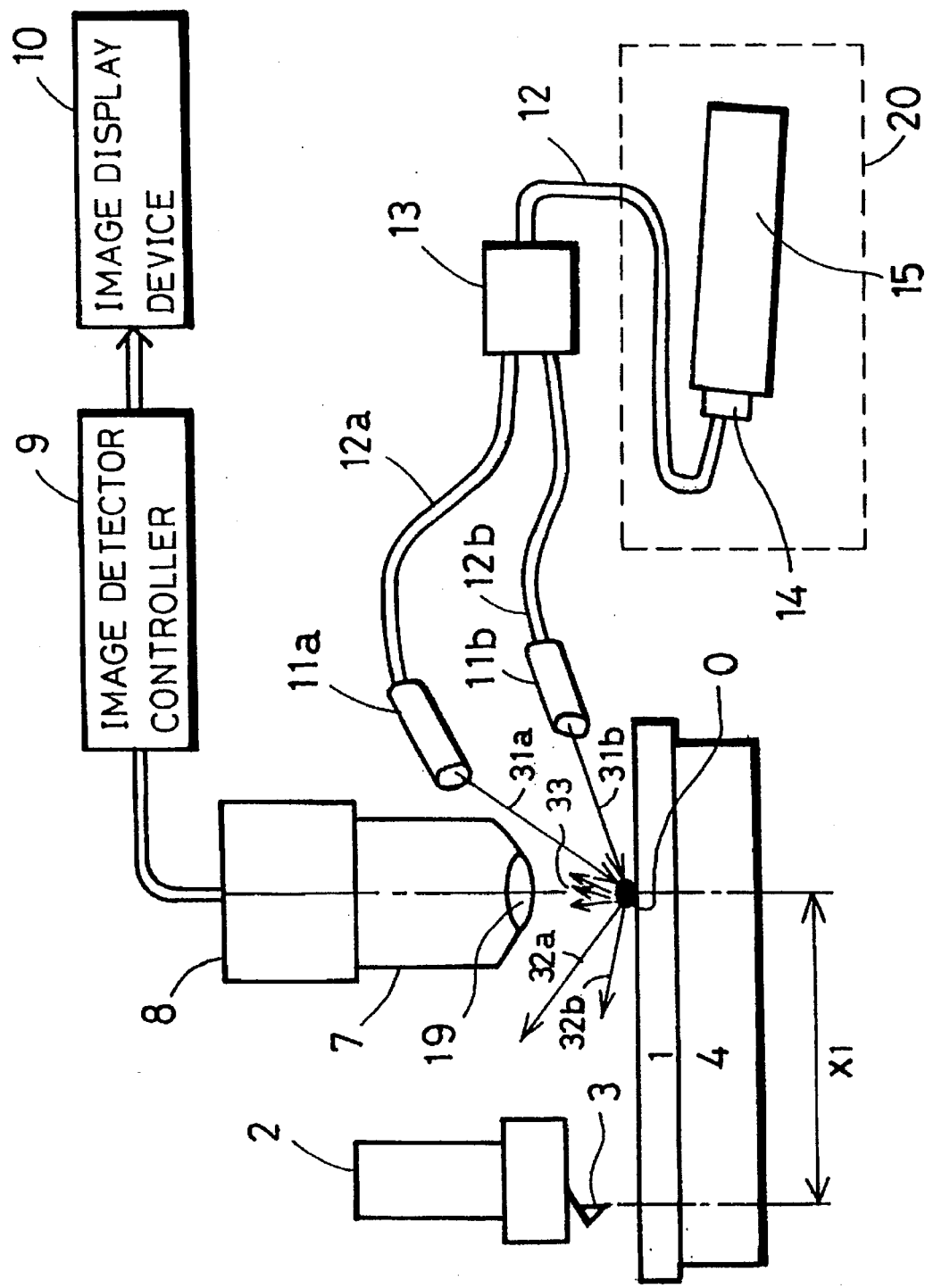
FIG. 2 is a view showing the structure of a light-scattering optical system, and in which optical fibers are used.

The light-scattering optical system is particularly shown in FIG. 2. In order to detect the position, or coordinates, of the foreign substance 0 on the wafer 1, incident light rays 31a and 31b are introduced into fibers 12 from a 50 W-class Ar laser 15 via a coupler 14. The light rays are directed to a region of about 1 mm² via an optical path-switching device 13 and via illuminating lenses 11a and 11b. This region is located just under the optical microscope. At this time, light is delivered from only one of the illuminating lenses 11a and 11b by switching of the optical path-switching device 13. Since the optical system assumes a dark field structure, if the foreign substance 0 is absent, only regularly reflected light 32a or 32b occurs; scattered light 33 is not produced. On the other hand, if the foreign substance 0 exists, the scattered light 33 is produced and observed as a bright spot on an image display device (CRT) 10 via all of the optical microscope 7, a high-sensitivity image detector (CCD camera) 8, and a high-sensitivity image detector controller 9.

First, the magnification of the objective lens 19 of the optical microscope 7 is set to 5 x. The field of view is set to about 2 mm. After detecting the bright spot attributed to the foreign substance 0, the magnification is set to 50 x, and the field of view is set to about 200 µm. The bright spot is precisely brought into the center of the optical axis. Then, the AFM in which the stage has been again caused to move the known amount $x_1$ as described above makes a measurement.

In this way, the magnification of the objective lens is changed. The observed field is switched from a wide field of view to a narrow field of view. Therefore, even if deviation of coordinates of more than about±100µ exists, foreign matter can be easily discovered.

The accuracy of the alignment is described. Where the coordinates are linked to the foreign matter-inspecting apparatus as described above, the aligning accuracy is on the order of ±100 µm.

The region irradiated with the incident light is about 1 mm². When an objective lens of 50 x is used, the field of view of the optical microscope 7 is about 200 µm □. The number of pixels of the high-sensitivity image detector 8 is $10^6$. The image resolution of the detection system is 200 µm/$10^3$=0.2 µm. In practice, however, because of the diffraction limit of the objective lens, the resolution is approximately 0.3 µm.

Therefore, with this light-scattering optical system, foreign matter can be detected at a positional accuracy of about 0.3 µm. The accuracy of movement of the stage is about±2 µm. Consequently, if the AFM instrument 2 scans an image with a field of view of about 5 µm □, foreign matter of the order of 0.1 µm can be detected. If this light-scattering system is incorporated in the AFM instrument 2, heat and vibration generated by the gas laser 15 varies the positional relation and interacting force between the probe and the sample. This impedes stable operation of the AFM. Accordingly, the gas laser 15 and the coupler 14 are incorporated in a separate enclosure 20 indicated by the broken line in FIG. 2. Incident light is introduced into the AFM instrument through optical fibers 12a and 12b.

A method of making a decision regarding unevenness of foreign matter, using optical means, is described next. This method is effected by measuring the light scattered by the foreign matter 0 while varying the angle of light incident on the sample 1.

Figure 3A:
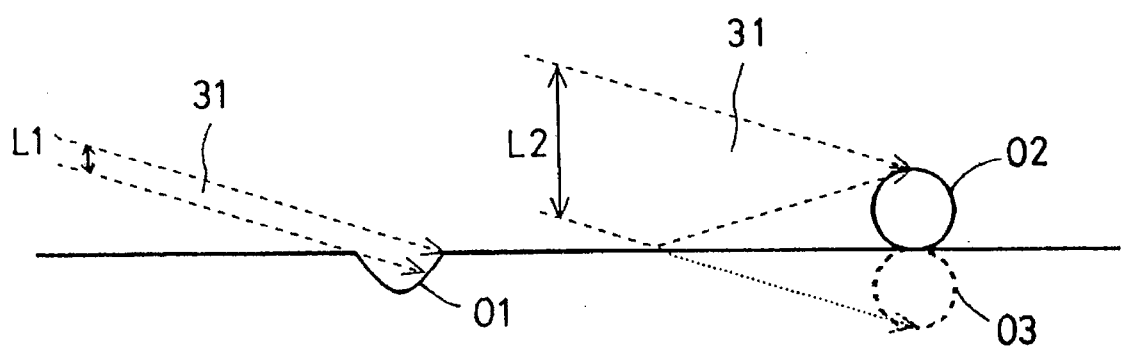
FIGS. 3A and 3B are views schematically showing foreign substances.
Figure 3B:
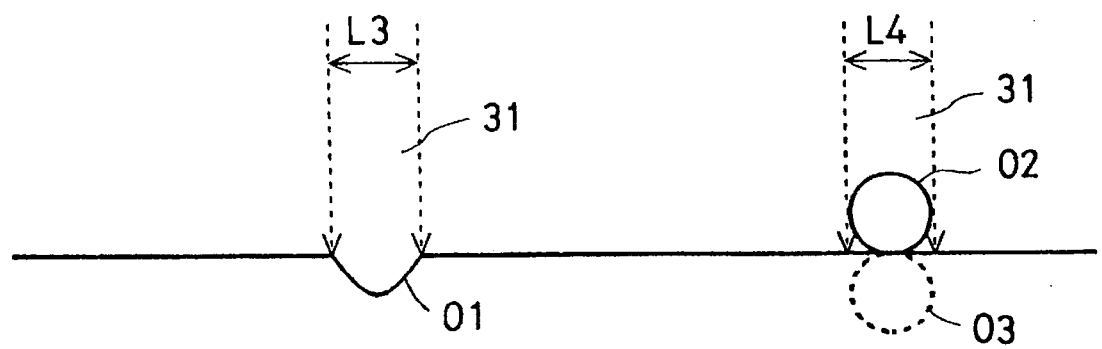

In FIG. 3A and 3B, a concave foreign substance 01 and convex foreign substance 02 are located on a sample 1. Laser light 31 is directed to these foreign substances tangential to the sample surface 1 (a) and vertical to it (b). Laser light cross sections L1–L4 used for the scattering when the laser light 31 is scattered by the foreign substances are shown. The concave foreign substance 01 and the convex foreign substance 02 have the same radius of a. First, the case in which the laser light 31 is made to enter tangential to the sample surface 1 (i.e., the incident angle is large) is discussed.

The laser light 31 cannot sufficiently enter the concave foreign substance 01 and so the laser light cross section L1 is less than $\pi a^2$. On the other hand, with respect to the convex foreign substance 02, the sample 1 is shadowed by the convex foreign substance and, therefore, the laser light cross section L2 is as large as about 2 $\pi a^2$. In consequence, where the laser light is entered tangential to the surface of the sample 1, the laser light cross section is varied by the difference between the convex and concave portions of the foreign substances. As a result, the intensity of the scattered light is varied greatly.

The case in which the laser light 31 is entered vertical to the surface of the sample 1 (i.e., the incident angle is small) is discussed next. Since the laser light sufficiently enters the concave foreign substance 01, the laser light cross section L3 is $\pi a^2$. Also, for the convex foreign substance, the laser light cross section L4 is $\pi a^2$. In this way, where the laser light 31 is entered vertical to the surface of the sample 1, the laser light cross section is not varied by the unevenness of the foreign substance. Consequently, the intensity of scattered light is hardly varied. In view of the results of the discussion made thus far, variations of the intensity of the scattered light caused when the incident angle of the light incident on uneven foreign matter on the surface of the sample 1 is varied are now discussed. It can be seen that as the incident angle of the laser light incident on the concave foreign substance 01 is increased, the intensity of the scattered light decreases. Conversely, with respect to the convex foreign substance, the intensity increases. Variations in the intensity of the scattered light 33 observed with the microscope 7 are measured while varying the incident angle of the laser light 31 incident on the surface of the sample 1. In this way, it can be known whether the foreign substance 0 lying on the surface of the sample 1 is concave or convex.

Figure 4:
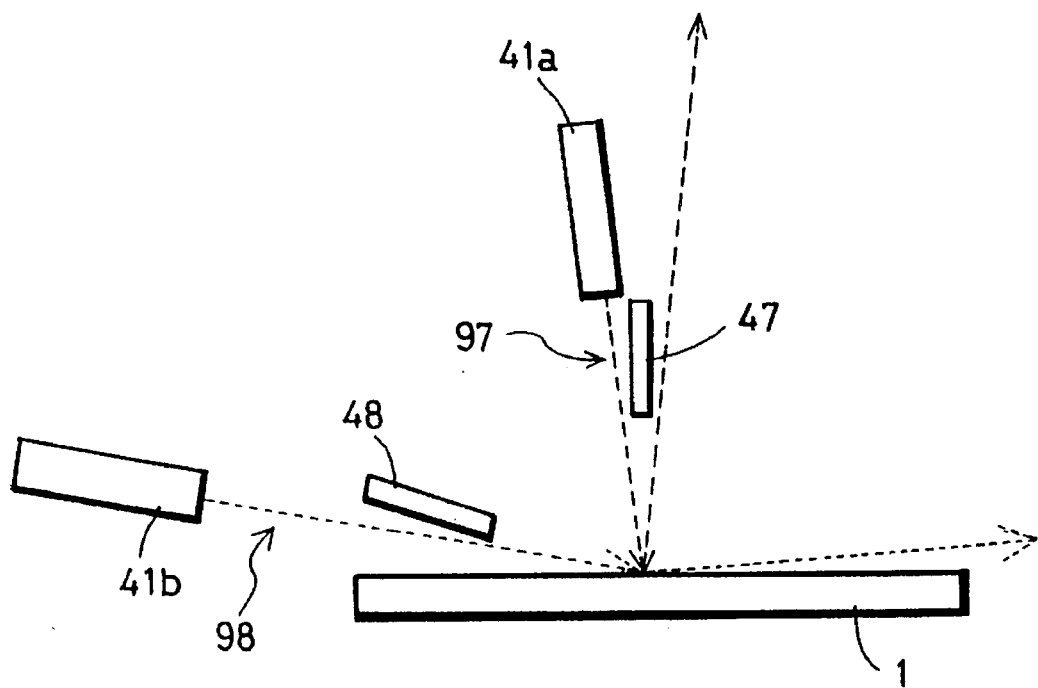
FIG. 4 is a view showing the structure of a light-scattering optical system, illustrating the present example.

FIG. 4 shows an optical system assembled to determine whether the foreign substance 01 on the surface of the sample 1 is concave or convex. There are two microscopes. An optical microscope 47 is mounted on the optical axis of laser light 97 which is incident on the foreign substance at a small incident angle from a laser light source 41a. Another optical microscope 48 is mounted close to the optical axis of laser light 98 incident on the foreign substance at a large incident angle from a laser light source 41b. First, the laser light 97 is made to enter the foreign substance 0 on the surface of the sample 1 at a small incident angle. The intensity I0 of scattered light entering the optical microscope 47 is measured. Then, the laser light 98 is entered at a large incident angle. The intensity I1 of scattered light entering the optical microscope 48 is measured. The ratio of the measured I1 to I0 is taken. It is determined whether the foreign substance is convex or concave, depending on whether the ratio is greater or less than 1. That is, if I1/I0 is in excess of 1, the evaluated foreign substance is judged to be convex. Conversely, if it is less than 1, the substance is judged to be concave.

Figure 5:
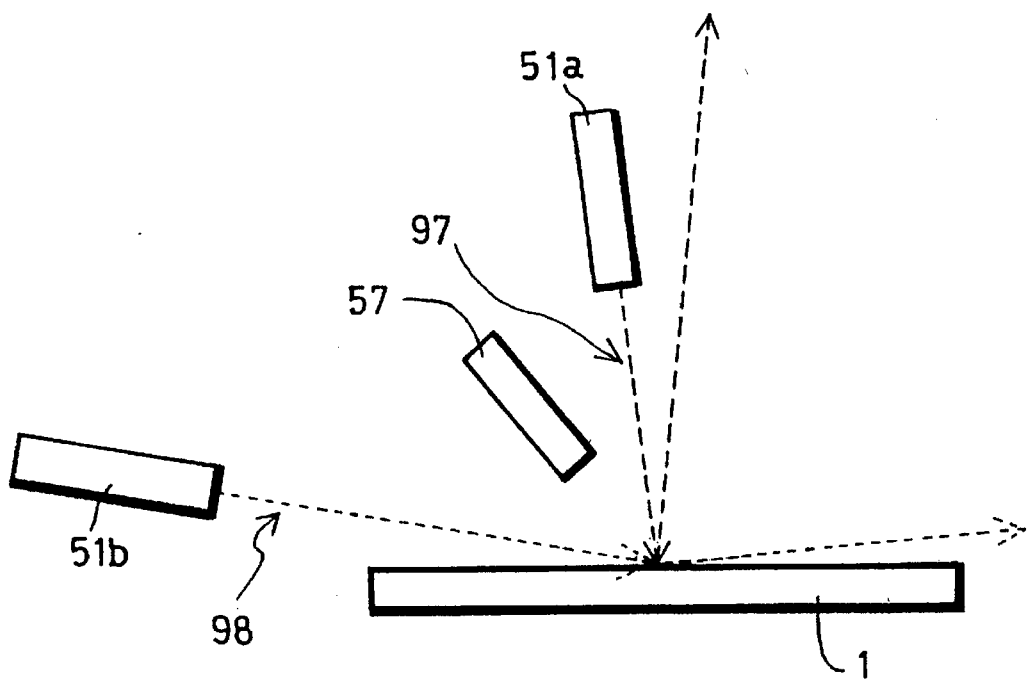
FIG. 5 is a view showing the structure of a light-scattering optical system, illustrating the present example.

In FIG. 5, scattered light is observed with a single microscope instead of the two microscopes shown in FIG. 4. The microscope is located on an axis having an angle equal to half of the sum of the angle of laser light incident at a small incident angle and the angle of laser light incident at a large incident angle. These laser light rays incident at their respective incident angles result in their respective scattered light rays over the sample. It is assured that these two scattered light rays have substantially the same solid angle and the same scattering angle. This makes it possible to accurately determine whether the foreign substance is concave or convex.

Figure 6:
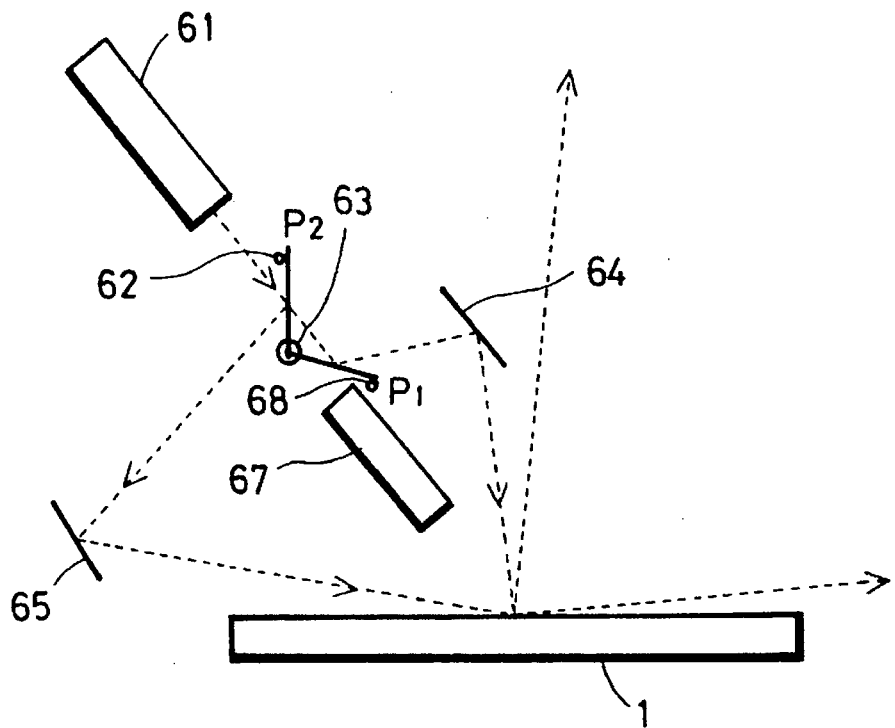
FIG. 6 is a view showing the structure of a light-scattering optical system, illustrating the present example.

In FIG. 6, scattered light is observed with a single optical microscope 67 and one laser illumination system 61. A rotating mirror 63 is made to abut against a rotation stopper 68 and is installed at $P_1$, thus producing light incident at a small incident angle. Light incident at a large incident angle is obtained by causing the mirror to abut against a rotation stopper 62 and is installed at $P_2$.

Figure 7:
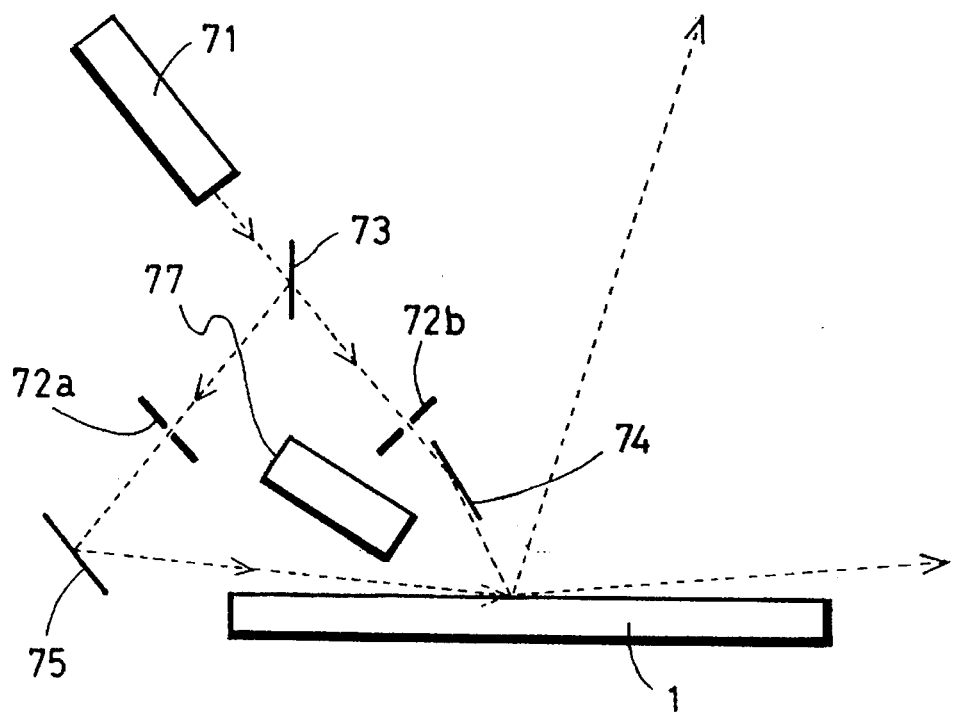
FIG. 7 is a view showing the structure of a light-scattering optical system, illustrating the present example.

FIG. 7 shows an optical system built, using a half mirror 73, to produce the same effect as produced in FIG. 6. FIG. 2 shows an optical system constructed, using optical fibers 12, to yield the same effect as produced in FIG. 6. The optical path-switching device 13 is used to switch the incident angle.

Figure 8:
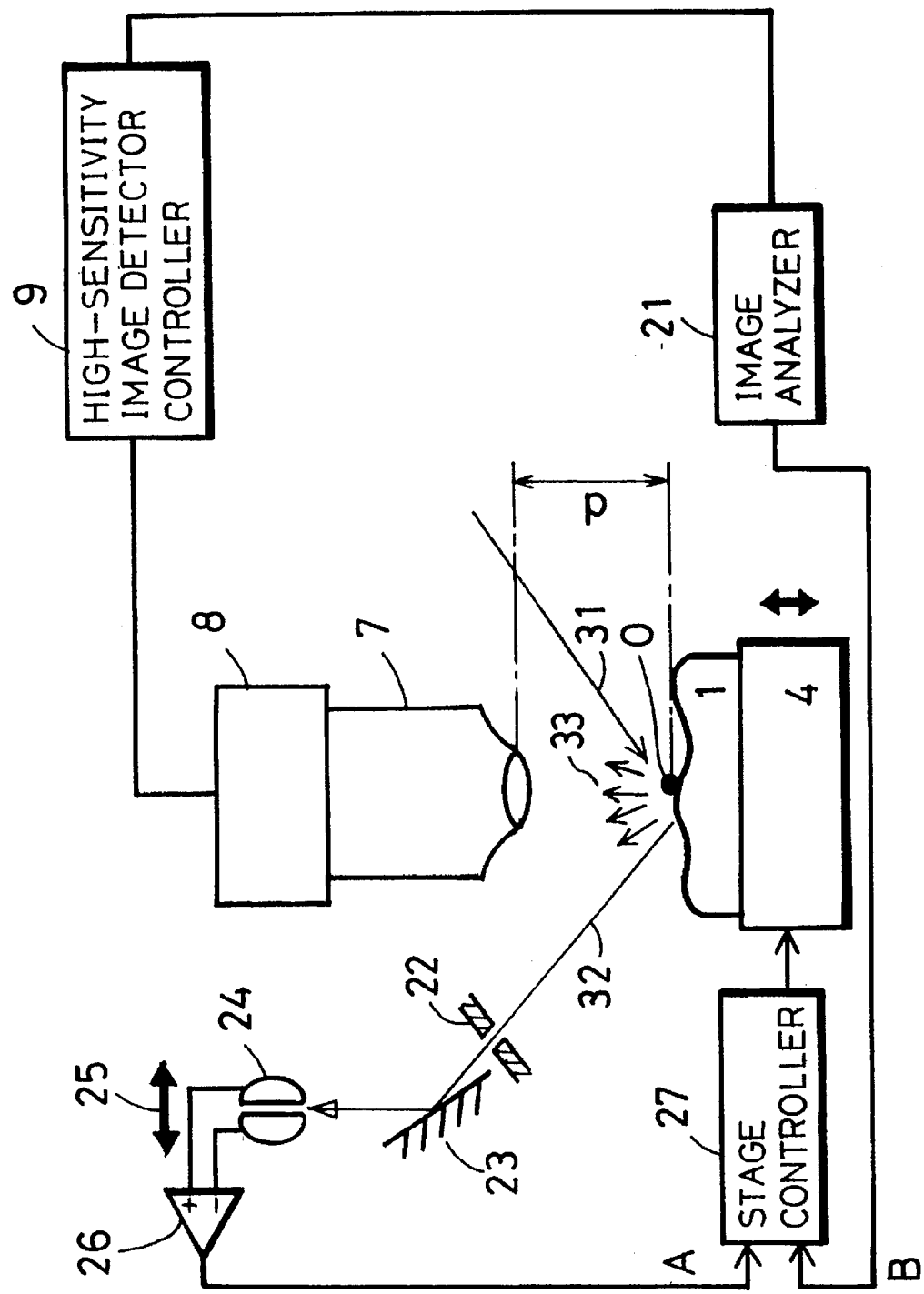
FIG. 8 is a schematic diagram showing the dark field automatic focusing.

A method of automatically focusing the aforementioned dark field light-scattering system is described below.

Where a mirror surface such as of a wafer is observed, almost no scattered light is produced in the dark field light-scattering system. Therefore, it is difficult to focus the microscope. The sequence in which the focusing operation is performed is described below by referring to FIG. 8.

First, the objective lens is brought to focus, using a relatively large foreign substance $0_1$ (about 1 μm). Let $d_0$ be the distance d between the objective lens and the sample at this time. At this time, a one-axis stage 25 is so adjusted that light 32 reflected by the wafer surface passes through a slit 22, passes through a mirror 23, and uniformly illuminates a position detector 24 split into two parts (calibration of the position of the detector).

Secondly, the xy-stage is moved to a foreign substance $0_2$ which is actually measured. In order that the two parts of the detector 24 be kept uniformly illuminated with light during movement, outputs from the two-part detector 24 are applied to a differential amplifier 26, and the difference signal between the two detectors is applied to a stage controller 27, for vertically moving the z-stage 4. If the tilt and flexure of the sample are small, and if the reflected light 2 is not shifted out of the two-part detector 24, the xy-stage may be moved to the foreign substance $0_2$. Then, the z-stage may be controlled so that the two parts of the detector 24 are uniformly illuminated with light. Let $d_1$ be the distance between the objective lens and the foreign substance at this stage. Rough adjustment has been described thus far.

Thirdly, the rough-adjustment loop is disconnected, and a fine adjustment is made. For this purpose, the z-stage is moved up and down about the $d_1$ over a distance of $\Delta d$, which varies according to the magnification but is about 1 to 20 μm. At this time, the z-stage is controlled in such a way that the distance d between the objective lens and the foreign substance is $d_f$ when the half-value width L of the scattering image of the foreign substance $0_2$ obtained through the optical microscope 7, the high-sensitivity image detector 8, the high-sensitivity image detector controller 9, and an image analyzer 21 assumes its minimum value (fine adjustment), thus ending the automatic focusing.

Then, the rough-adjustment loop is again connected when movement to another foreign substance $0_3$ is made. The z-stage is controlled according to signals from the two-part detector.

The detection system is described in detail below.

Figure 9A:
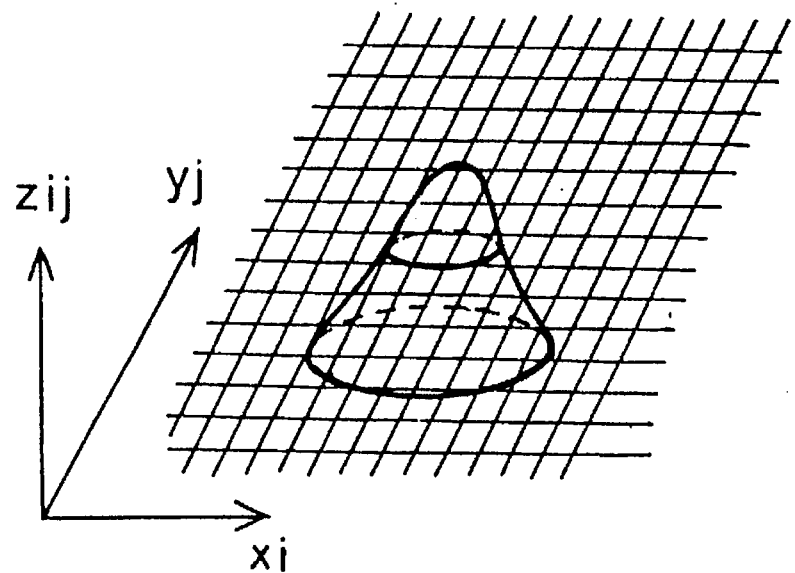
FIGS. 9A and 9B are schematic views showing an image analyzer.
Figure 9B:
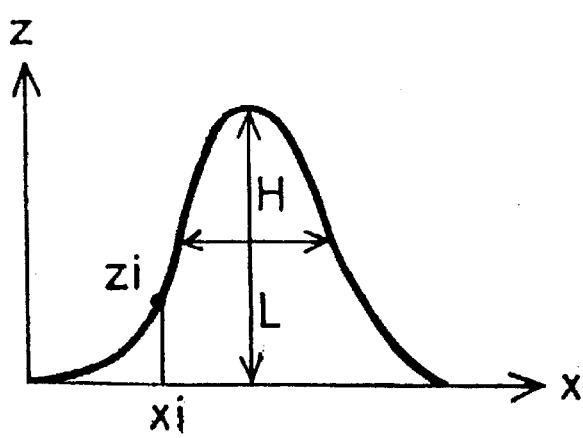

CCD camera C2400 series manufactured by Hamamatsu Photonics Corporation and using SIT tubes is available as the high-sensitivity image detector 8. A frame memory incorporated in the high-sensitivity image detector controller 9 and acting to accumulate plural frames of image is helpful in enhancing the S/N of feeble scattered light from minute foreign matter. FIG. 9A and 9B illustrate the operation of the image analyzer for finding the half-value width of the scattered light image from foreign matter.

An image signal sent from the high-sensitivity image detector controller 9 is represented by $(x_i, y_j, z_{ij})$ and is a three-dimensional signal, where $x_i$ and $y_j$ are the coordinates of the position, and $z_{ij}$ is the intensity of scattered light at that point. Here, an accumulation is performed in the y-axis direction to find the intensity of scattered light in the x-axis direction.

$$z_i = \sum_j^n z_{ij}$$

Using the above formula, $(x_i, z_i)$ is found.

It is to be noted that $x_i$ is a point in the x-axis direction and that $z_i$ is the intensity of scattered light accumulated in the y-direction at this point. The half-value width L is found from the relation $x_i$-$z_i$.

Figure 10:
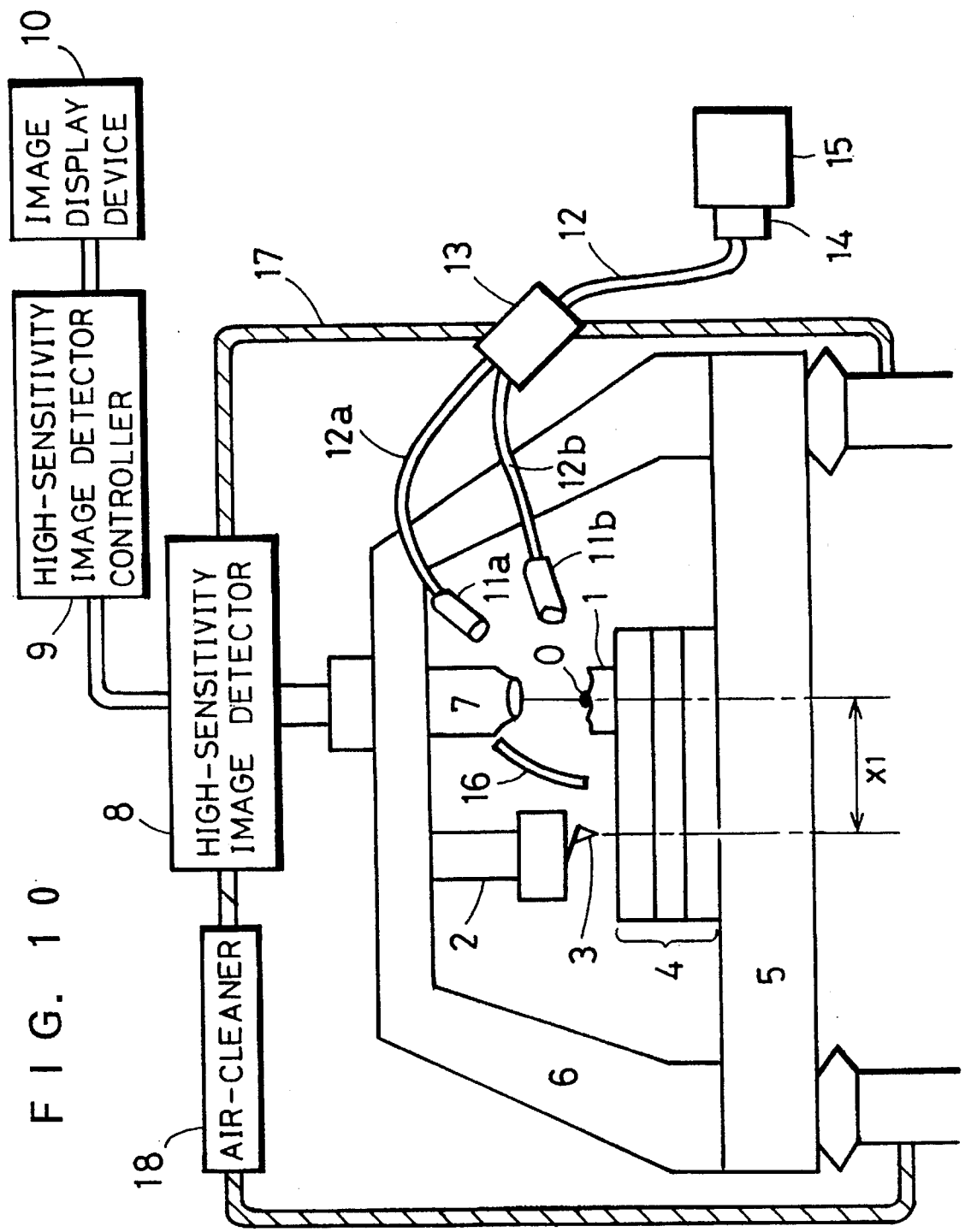
FIG. 10 is a diagram showing an example of an AFM instrument.

FIG. 10 shows an example of the light-scattering optical system incorporated in an actual AFM instrument for a large sample.

The apparatus is constructed as follows. An AFM scanning system 2 and an optical microscope 7 are mounted to a high-rigidity arm 6 on a vibration-isolating base 5. A detector for an optical image is composed of a high-sensitivity CCD detector 8, a controller 9 for the detector 8, and an optical image display device (CRT) 10. Laser illuminating systems 11a and 11b are connected with a laser light source 15 via optical fibers 12a, 12b, an optical path-switching device (optical switch) 13, and a coupler 14.

A light reflection-preventing device 16 for preventing scattered light is mounted at the position of regular reflection from the sample surface. The light reflection-preventing device 16 absorbs light incident on it and prevents reflected light from returning to the sample. A sample 1 is placed on an xyz table 4 and able to move a distance equal to the distance $x_1$ between the cantilever 3 and the optical axis of the optical microscope (the automatic focusing system is omitted here). The whole apparatus is covered by a dark box 17 which also provides sound insulation. We have found that the dark box 17 and the light reflection-preventing device 16 are useful in enhancing the S/N when feeble scattered light from a minute foreign substance (less than 0.1 μm in diameter) is measured.

An air cleaner 18 is mounted to the top of the apparatus to maintain the cleanliness of the air inside the dark room below about class 50. This reduces adhesion of foreign matter from the apparatus to the sample surface during measurement.

According to the invention, a foreign matter-inspecting apparatus and an AFM instrument can be easily linked together in terms of coordinates. Also, the topography of the foreign matter can be readily measured by the AFM. Furthermore, concave portions of the foreign matter can be distinguished from convex portions by optical means. This is combined with a dark field automatic focusing mechanism to enhance the throughout of measurements of foreign matter. In addition, the gas laser which is a source of heat and vibration is separated from the main enclosure. Incident light is introduced through optical fibers. As a result, noises due to vibration and heat generated decrease. Moreover, drift of the image decreases. In consequence, AFM measurement can be made with high reproducibility.

What is claimed is:

1. In a scanning probe microscope with aligning function, said scanning probe microscope having an xyz-stage on which a sample is placed and which moves said sample, an atomic force microscope (AFM) equipped with a cantilever having a probe at its free end, the probe being scanned along a surface of said sample for measuring topography of said sample, an optical microscope having an optical axis spaced a given distance from said cantilever, the optical microscope being adapted to observe said sample surface, and light-illuminating portions for illuminating said sample surface from an oblique direction, the improvement wherein said optical microscope is located in a dark field portion for light incident on said light-illuminating portions, and wherein angle of said incident light with said sample surface or direction of said optical microscope can be varied at will.

2. In a scanning probe microscope with aligning function as set forth in claim 1, the further improvement wherein light entered from said light-illuminating portions is guided by optical fibers from a light source which is located outside an enclosure that accommodates said xyz-stage, said AFM instrument, and said optical microscope.

3. In a scanning probe microscope with aligning function as set forth in claim 1, the further improvement wherein said light-illuminating portions are at least two in number, and wherein incidence of light to the optical fibers connected to said light-illuminating portions is switched by switching light from said light source by means of an optical path-switching device.

4. In a scanning probe microscope with aligning function as set forth in claim 1, the further improvement wherein light reflected from the sample surface is detected by a light detector divided into two parts during focusing of a dark field optical system, distance between the sample and focus of the optical microscope is roughly adjusted according to variations of signal caused by tilt of the sample surface and by unevenness of the sample, and then focal distance is fine-adjusted according to minimum value of half-value width of a scattered light spot.

5. In a scanning probe microscope having aligning function as set forth in claim 1, the further improvement wherein the whole apparatus is put in a dark chamber to detect light scattered from the sample with a high S/N, and wherein there is further provided an optical attenuator for attenuating light reflected from the sample to prevent light from returning to the sample surface.

* * * * *

UNITED STATES PATENT AND TRADEMARK OFFICE
CERTIFICATE OF CORRECTION

PATENT NO. : 5,650,614
DATED : July 22, 1997
INVENTOR(S) : MASATOSHI YASUTAKE; NAOHIKO FUJINO It is certified that error appears in the above-indentified patent and that said Letters Patent is hereby corrected as shown below:

On the front page, Col. 1, under [73] Assignee, add "SEIKO INSTRUMENTS INC., CHIBA, JAPAN".

Signed and Sealed this

Third Day of November, 1998

*Attest:*

BRUCE LEHMAN

*Attesting Officer*     *Commissioner of Patents and Trademarks*